March 4, 1958   G. M. SPENCE   2,825,626
REMOVAL OF ALKALI METAL OXIDE FROM SOLID RESIDUES
Filed March 21, 1955
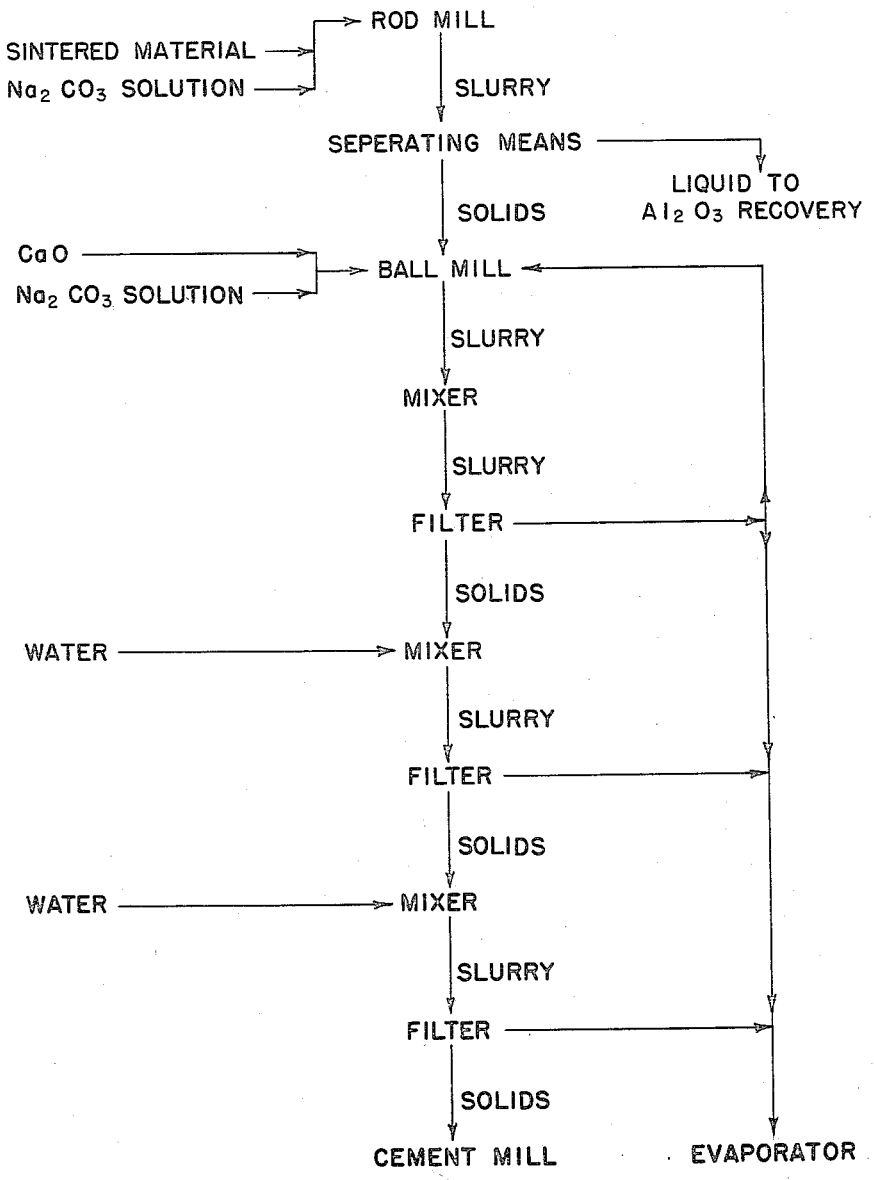
INVENTOR
Gerald M. Spence
by Edd D. O'Brien, Atty.

United States Patent Office 2,825,626
Patented Mar. 4, 1958

2,825,626

REMOVAL OF ALKALI METAL OXIDE FROM SOLID RESIDUES

Gerald M. Spence, Laramie, Wyo., assignor to Monolith Portland Midwest Company, Los Angeles, Calif., a corporation of Nevada Application March 21, 1955, Serial No. 495,641

1 Claim. (Cl. 23—110)

The present invention relates to the removal of undesirable alkali metal oxide from solid residues resulting from various processes for the extraction or recovery of alumina from different sources.

In such processes for the recovery of alumina, generally a number of separate mineral components are mixed together and sintered so as to form a solid product which is then leached with an alkaline solution, in order to place the alumina present therein in solution in the form of sodium aluminate. Following this step, the resultant solution is separated from various insoluble residues.

These residues normally contain very large quantities of dicalcium silicate a constituent of cement clinker, and, hence, are considered to be advantageous materials for use in cement manufacture, if the quantity of alkali metal oxide generally present, such as $Na_2O$ within them can be reduced to a comparatively low point. Frequently such residues also contain large quantities of other materials besides alkali metal oxide which tend to make them unsuitable for use in cement manufacture. However, such other materials can be compensated by various conventional processes already known to the art. For some unknown reason, the alkali metal oxide, generally referred to as soda within such residues has not been capable of being removed from these residues by economically feasible conventional extracting or leaching steps carried out with the aid of common equipment, such as, for example, the Dorr thickeners or the like. It is believed that the lack of effectiveness of simple washing processes of this category relates to the fact that this alkali metal oxide is both occluded within and chemically combined with the residues. Thus, the term "alkali metal oxide" as used herein is not limited to uncombined alkali metal oxide such as sodium oxide, but includes a number of compounds formed which include sodium oxide combined with other oxides, such as, calcium oxide, ferric oxide and silicon dioxide. The precise chemical nature of such compounds is not known to any degree of certainty, but there is ample evidence that compounds of this type exist within residues capable of being used in the manufacture of cement.

It is an object of the present invention to provide a new process for the removal of undesired alkali metal oxide from various residues such as are broadly indicated in the above discussion. A more specific object of the invention is to provide a process for use in accomplishing this end which is relatively simple and which can be carried out utilizing substantially conventional equipment with a minimum of difficulty. A further object of the invention is to provide a process for the purpose described which is economically feasible and practical.

The precise details of the instant invention are best apparent from the appended claims, which constitute a brief summary of the actual inventive concept present within this application. However, the present invention may be briefly summarized as being concerned with a process of the class described in which residues from the recovery of alumina from various ores are hydrated in such a manner as to change their chemical composition and so cause the release of occluded and chemically combined alkali metal oxide, and then separating and washing these residues so as to produce a final product which is substantially free from undesirable alkali metal oxide. The precise details of this process are best more fully explained in the remainder of this specification, the appended claims and the accompanying drawing, in which there is shown a flow sheet illustrating the operative steps in one application of the instant invention.

The application of the invention illustrated in the flow sheet relates to the use of the invention with products produced from starting materials such as are indicated as being employed in the example of the Anderson et al. Patent 2,421,918. These starting materials are designated in the flow sheet as sintered material, and may consist of a mixture of aluminum silicate minerals, such as, for example, kaolin or anorthosite, fluorspar, and marl or limestone together in an appropriate sintering kiln. The product of such a sintering kiln is in the Anderson patent passed to a mill together with a soda ash solution, as indicated in the flow sheet, where the solids are ground so as to place any aluminum oxide present in the sintered material in solution in the form of sodium aluminate. The precise mill shown in the flow sheet is the equivalent of the sinter mill shown in the aforesaid Anderson et al. patent. From it, the resulting slurry is passed to what is broadly indicated in the flow sheet as separating means. These separating means may comprise a leacher, such as is shown in the Anderson patent, or may comprise a series of filters or a series of filters and thickeners or like apparatus designed to accomplish the same purpose. From the separating means, the liquid sodium aluminate solution is recovered and sent to various equipment utilized in the recovery of alumina. If desired, sugar may be added to the slurry from the mill prior to or during treatment of this slurry in the separating means in order to prevent the premature hydration of any dicalcium silicate present within the slurry.

A major component of the solids separated by the separating means, forming the actual starting material used in the example of this specification, is dicalcium silicate, and, as indicated above, this ingredient may contain substantial quantities of residual sodium oxide, commonly termed "soda" which is thought to be both occluded within such solid material and to a substantial extent to be chemically combined with this material. The precise means by which sodium oxide is held within these solids or similar solids is not known, but, based upon experience with the material involved, it is assumed that this alkali metal oxide is both occluded within the solids and chemically combined with them as indicated. Conventional leaching processes utilizing vast quantities of wash water are not always economically feasible in removing this alkali metal oxide from such solids so as to make them, and in particular the dicalcium silicate present within them, suitable for use in the manufacture of many grades of cement.

Surprisingly enough, it has been discovered that if the solids separated by the separating means indicated in the flow sheet are hydrated, the majority of the remaining sodium oxide contained in these solids may be readily removed from them by simple washing procedures. A number of distinct means and procedures can be utilized to accomplish the hydration. Amongst these means is merely allowing the solids resulting from the separating step to sit in the presence of moisture for an extended period; or soaking these solids in a tank of water for an extended period. Such means are not commercially feasible, however. It has been determined that the most rapid separation of sodium oxide from solids takes place by intermixing the solids from the separating step with a small quantity of caustic material, usally sodium carbonate together with quick or hydrated lime, although other caustics which serve to speed up the hydration of these solids such as sodium hydroxide can be employed. This use of sodium carbonate and lime is not, however, absolutely necessary with the invention since other means for increasing the hydration rate can be employed, although it is an advantage from a commercial standpoint. The object of the addition of the caustic material is to materially speed up the rate of hydration of the dicalcium silicate thus rendering all occluded sodium oxide easily soluble. The purpose of the addition of the quick or hydrated lime with sodium carbonate with the preferred embodiment of the invention is twofold, viz: first, it has the ability to causticize sodium carbonate to sodium hydroxide or caustic soda which enable the use of soda ash in the functioning of this present invention in place of the more costly caustic soda. Second, the quick or hydrated lime in itself appears to have a special function with regard to the elimination of sodium oxide from these dicalcium silicate residues in that there is probably formed within the dicalcium silicate an appreciable quantity of zeolite type material such as sodium aluminum silicate compounds which are insoluble under conditions existing in the separating means aforementioned. In the presence of ionizable calcium compounds the sodium component of zeolite type material is replaced with calcium thus liberating the sodium in a soluble form which may be easily removed by washing.

The intermixture of materials, as shown in the flow sheet, can be carried out in any type of equipment that will give intimate mixing of the wet or wetted residue from the separating means with caustic material added. When the lime used commercially is, for economic reasons, burned limestone in the lump form, a preferable type of mixing equipment is a ball mill as indicated in the accompanying flow sheet or a rod mill in that the passing of the materials through such a mill will grind the coarse limestone thus greatly increasing the speed of causticization of the soda ash and at the same time very intimately mix the components. The slurry produced by whatever method of mixing employed can be passed to a mixing vessel which agitates the slurry so as to maintain complete contact between the various ingredients. Preferably, the slurry produced in the ball mill employed and held in the mixing vessel is at a temperature below boiling in order to promote or speed up hydration of the dicalcium silicate present. A convenient temperature for use is about 190° F. The material within the mixer is further preferably held within this vessel until such time as substantial hydration of the dicalcium silicate in the solids has occurred.

With a solid residue such as is produced in the specific examples of the Anderson et al. Patent 2,421,981, indicated above, using a mixture or slurry containing approximately 200 lbs. of solids from the separating step referred to above, 400 lbs. of water, 25 lbs. of 50% soda ash, and 25 lbs. of quicklime, the desired hydration occurred in the mixer used in about fifteen minutes at 190° F. This period is in addition to approximately five minutes consumed during mixing in a ball mill.

During the hydration step, the color of the slurry within the mixer changed from an initial brown color to a substantially white color, and further, there was an accompanying rise in temperature of approximately 5° F. A slight thickening of the slurry within the mixer was also noted. It is considered that either the rise in temperature or the color change accompanying this hydration may be taken as an indication that substantially complete hydrolysis is taking place within the slurry. This hydrolysis, as indicated above, is considered necessary in order to accomplish the release of sodium oxide from the solids present in order to produce a low sodium oxide content residue which is suitable for the manufacture of many grades of cement. Because of the complex nature of the chemical composition of the solids treated as indicated, it is not considered practical or feasible to specify the precise degree of hydration allowed to take place during the indicated process steps. Normally this treatment to produce hydrolysis is continued past the time required to produce the various changes indicated in order to make sure that practically all of the dicalcium silicate is hydrolyzed. Those skilled in the art will be able to determine for any given solid residue the precise times, temperatures and concentrations to be used during this hydration with a minimum of difficulty. If sugar has been utilized to prevent hydrolysis of the dicalcium silicate within the separating means indicated above, as is frequently done, the amount of material added must be sufficient to counteract the sugar present. Occasionally, it is possible to dispense with the use of caustic material during the hydrolysis step, although, as a general rule, it is not considered advisable inasmuch as the caustics used are cheap reagents which speed up the hydrolysis taking place to a substantial extent, and which serve the functions indicated in the preceding discussion.

The slurry resulting from the mixer indicated above was taken from this mixer after a total time in the mixer of about 45 minutes, and was passed to a filter. From this filter, the resulting solids were passed to another mixer where they were mixed with water and washed. The slurry from this other mixer was then passed to a second filter, as indicated in the flow sheet, where solids were again separated and then again washed with water in still another mixer. The slurry from this last mixer was passed to another filter which separated the final solids produced in accordance with this process. These solids were comparatively low in sodium oxide content and could be used directly within a cement mill, although as a general rule, it is desired to admix such solids with other ingredients of cement, such as, for example, marl.

A filtrate from the first of the filters indicated in the preceding discussion may be recirculated, as indicated in the flow sheet, to the ball mill where it is utilized instead of a part of the sodium carbonate solution. When the concentration of sodium oxide within this filtrate has been built up to a sufficiently high point, from an economical aspect, this filtrate may be admixed with the filtrates from the other filters and passed to an evaporator, as indicated, for the recovery of the alkali metal oxide present. This recovery of alkali metal oxide occluded within solids is an important economical aspect of the instant invention which enables the invention to be utilized for many specific operations where it otherwise would not be economically feasible.

In utilizing the invention, the solids resulting from the various filter operations are preferably mixed within the mixers indicated with approximately double their weight of water. Thus, utilizing the figures indicated, for approximately each 200 lbs. of leached residue used with the process and obtained from the separating means indicated, approximately 400 lbs. of water is added to each of the mixers outside of the initial mixer indicated. It is not considered necessary to add any chemical additives, such as the lime indicated above, to such wash water. However, in order to obtain efficient washing action, it is generally preferred to have the wash water employed at an elevated temperature. Extremely effective results have been obtained with the wash water at approximately 190° F. in carrying out the invention as indicated. The time a slurry is in either of the latter two mixers employed with the invention will, of course, vary depending upon the efficiency of the mixers and other obvious, related factors. Generally, however, a period of time about equal to the time required to produce hydration within the initial mixer employed with the invention is adequate. Thus a period of about fifteen minutes is utilized with the quantities of materials indicated when the washing is carried out in high speed mixers.

The efficiency of the invention is at once apparent from a consideration of the analysis of the solids involved both before and after treatment as herein indicated. Such solids, consisting largely of dicalcium silicate, when treated under the conditions indicated above, have been reduced from an average initial soda content of 4.07% to an average final soda content of 0.80%. It is needless to say that the final percentage of soda within the product produced is well within the limits permissible in the manufacture of common grades of cement.

The actual application of the herein described invention is not to be considered as being limited to the precise operative steps indicated in the above discussion, or the precise starting material indicated in this discussion. For example, the herein described invention is believed to be of extreme utility in forming a valuable product from the discarded residues known to the trade as "brown mud," produced in accordance with the process for the production of alumina set forth in the Brown Patent 2,375,342. Such brown mud is extremely high in silica and iron content, but these undesirable items for cement manufacture can be removed from such mud or compensated for with a minimum of difficulty by other procedures known to the art. Substantially no modifications are required in the precise operating steps indicated above to use the instant invention with such brown mud, although, if desired, modifications may be made.

As an example of such modifications, it is possible to introduce a third washing step into the procedure shown in the flow sheet and described in the above discussion when the process of the invention is being carried out with either the so-called "brown mud" or with solids recovered in the Anderson et al process, as indicated above; although it is also possible to omit one or more of the washing steps shown. In general, however, the longer and the more washing steps carried out, the more complete the removal of alkali metal oxide from the solids being purified in accordance with this disclosure. If desired, the washing employed can be carried out entirely upon a filter, or in a conventional thickener.

I claim as my invention:

A process for the removal of chemically combined and occluded alkali metal oxide from solid residues containing dicalcium silicate and alkali metal oxide combined and occluded therewith, which comprises: admixing said solid residues with lime, soda ash, and water so as to cause hydration of said dicalcium silicate in order to effectuate the release of chemically combined and occluded alkali metal oxide within said dicalcium silicate; separating the solids; and repeatedly washing said solids with water.

References Cited in the file of this patent

UNITED STATES PATENTS

| | | |
|---|---|---|
| 197,106 | Crosby | Jan. 29, 1877 |
| 1,604,427 | Spicer | Oct. 26, 1926 |
| 1,757,374 | Kriegsheim et al. | May 6, 1930 |
| 1,813,575 | Janecke et al. | July 7, 1931 |
| 1,964,685 | Folger | June 26, 1934 |